(12) United States Patent
Russell

(10) Patent No.: US 6,622,136 B2
(45) Date of Patent: Sep. 16, 2003

(54) INTERACTIVE TOOL FOR SEMI-AUTOMATIC CREATION OF A DOMAIN MODEL

(75) Inventor: Dale William Russell, Palatine, IL (US)

(73) Assignee: Motorola, Inc., Schaumburg, IL (US)

(*) Notice: Subject to any disclaimer, the term of this patent is extended or adjusted under 35 U.S.C. 154(b) by 316 days.

(21) Appl. No.: 09/785,893

(22) Filed: Feb. 16, 2001

(65) Prior Publication Data

US 2002/0116171 A1 Aug. 22, 2002

(51) Int. Cl.[7] ........................... G06F 17/00; G06F 15/18
(52) U.S. Cl. .............................. 706/45; 706/50; 706/61
(58) Field of Search ............................. 706/45, 150, 61

(56) References Cited

U.S. PATENT DOCUMENTS 6,226,792 B1 * 5/2001 Goiffon et al. ................ 717/11
6,247,007 B1 * 6/2001 Cooperman et al. .......... 706/50

OTHER PUBLICATIONS

Stankov et al, "TEX–SYS: An Authoring Tool for an Intelligent Tutoring System with Hypermedia", IEEE International Conference on sSystems, Man, and Cybernetics, Oct. 1997.*
R. Hwa, "Supervised Grammar Induction Using Training Data with Limited Constituent Information", Division of Engineering and Applied Sciences, Harvard University, ACL99–Proceedings of the 37th Meeting of the Assoc. for Computational Linguistics, pp. 73–79.
J. Baterman, "Some Apparently Disjoint Aims and Requirements for Grammar Development Environments: The Case of Natural Language Generation", Language and Communication Research University of Stirling, ACL–EACL '97 Workshop on Computational Environments for Grammar Development and Linguistic Engineering, Madrid, 1997, pp. 1–8.
C. Samuelsson, P. Tapanainen and A., Voutilainen, "Inducing Constraint Grammars", ICGI–3—International Colloquium on Grammatical Inference, 1996.

* cited by examiner

Primary Examiner—George B. Davis

(57) ABSTRACT

A method, system and program product 100 usable by domain developers having any experience level in creating domain models. A representation of domain model knowledge is derived from a domain specification. The domain specification includes multiple potential domain objects, e.g., tables of APIs functional arguments, and each of the potential domain objects include one or more attributes. Potential domain objects are selected one at a time 102 from the specification and offered to the developer. The developer decides 104 whether or not to include the potential domain object in the domain model. If the developer decides to include the potential domain object 106, then the system provides a default name 108, i.e., the table name or argument name, and allows the developer to rename the selected domain object 110. Then, after having selected the object, potential attributes 112, e.g., table columns 1122, are selected from the object and offered to the developer 116. If the developer decides to include a potential attribute, then a default name, i.e., the column name or name extracted from an API function, is offered 1126 for the selected attribute and the developer is allowed to rename attributes 1128. Once all the potential domain objects have been offered 118 to the developer and the developer has either decided to include the potential objects or not, the system checks the domain model for nesting structure 200. If domain objects include attributes that are shared with other domain objects 2006, then those domain objects may be reorganized such that some domain objects include instances of identically named attributes from other domain objects.

31 Claims, 6 Drawing Sheets

Semi-Automatic Induction of a Domain Model from a Database

100 — Create Domain Objects and Attributes from database tables and columns, respectively.
102 — For each table in the database
  104 — Ask developer whether Domain Model should contain a Domain Object corresponding to this table
    106   If response is yes
    108 — Create corresponding Domain Object
         — Ask developer to name the Domain Object, offering the name of the table as a default.
    110     If developer enters a non-default name
             — Name the Domain Object according to the developer's response.
    1122    Else
             — Name the Domain Object with the name of the table.
    1124 — For each column in the table
            Ask developer whether this Domain Object should contain a Domain Attribute corresponding to this column
            If response is yes
    1126      Create corresponding Domain Attribute
             — Ask developer to name the Domain Attribute, offering the name of the column as a default
    1128      If developer enters a non-default name
              Name the Domain Attribute according to developer's response.
              Else
    1130      Name the Domain Attribute with the name of the column.
             — Create an initially empty list of value types for this Domain Attribute
    1132      Create an initially empty list of values for this Domain Attribute
             — For each enrty in the column
    1134 —     If the type of the entry is not contained in the list of value types
    1136 —       Add the type of the entry to the list of value types.
    1138 —    If the value of the entry is not contained in the list of values
         —     Add the value of the entry to the list of values.
    1142  1140  Add the Domain Attribute to the Domain Object
             — Add the Domain Object to the Domain Model
    116

*FIG. 3*

200 — Determine which Domain Objects should serve as complex arritbute values of other Domain Objects
2002 — For each Domain Object in the Domain Model
2004 — For each other Domain Object in the Domain Model
2006,8 — For each Domain Attribute in the first Domain Object whose name is identical with a Domain Attribute in the second Domain Object
2010 — If the two Domain Attributes have non-conflicting value types
2012 — Ask the developer whether the first Domain Object should have a Domain Attribute whose complex value is an instance of the second Domain Object
2014 If developer response is yes
— Create a new Domain Attribute
2016 — Ask developer to name the new Domain Attribute, offer the name of the second Domain Object as a defalut.
2018 — If developer enters a non-default name
Name the new Domain Attribute according to developer's response
2020 Else
— Name new Domain Attribute according to the second Domain Object
Set the value type of the new Domain Attribute
2022 to be the type of the second Domain Object.
— Add the new Domain Attribute to the first Domain Object
2028 Else — *developer response is no*
— Prompt the developer to rename one or both the Domain Attributes. Offer as a default to prefix both Domain names with the name
2030 of their respective Domain Objects.
— If one or both Domain Attributes have been renamed
Propagate the name change throughout the rest of the Domain Model
2026 Else — *the two Domain Attributes have conflicting value types*
2028 — Inform the developer of a name clash.
— Prompt the developer to rename one of both of the Domain Attributes. Offer as a default to prefix both Domain Attribute names with the name
2030 of their respective Domain Objects.
— If one or both Domain Attributes have been renamed
Propagate the name change throughout the rest of the Domain Model

*FIG. 5*

INTERACTIVE TOOL FOR SEMI-AUTOMATIC CREATION OF A DOMAIN MODEL

RELATED APPLICATION

The present invention is related to U.S. patent application Ser. No. 09/785,719 entitled "An Interactive Tool for Semi-Automatic Creation of a Natural Language Grammar from a Domain Model" to Dale W. Russell, filed coincident herewith and assigned to the assignee of the present application.

BACKGROUND OF THE INVENTION

1. Field of the Invention

The present invention is related to language dialog systems and, more particularly to domain model creation for natural language dialog systems.

2. Background Description

In the development of spoken or natural language dialog systems, a representation, referred to as a domain model, is used in the creation of grammars, dialog managers and other system components. The domain model provides a useful, formalized representation of knowledge about the domain of an application that the system is addressing and reflects a particular domain expert's conceptualization of that knowledge.

Previously, domain models were handcrafted by the particular domain expert and crafting required substantial time and specialized expertise. Model development focus was directed to the acquisition of procedural knowledge for use by expert systems. Such knowledge was acquired and maintained in the form of rules for encoding instructions. The instructions were provided to the expert system and were the selected response for performing a given action under a given set of conditions. These methods all require a substantial amount of an expert's time.

To that end, tools are being developed to facilitate domain model development. One such tool is the LOOM knowledge representation system from Sun Microsystems which is a toolkit for the development of domain models by domain experts. A state of the art project that is based on LOOM is a domain model development toolkit called EXPECT. EXPECT uses the LOOM framework to construct domain models and provide an intuitive interface. However, to use EXPECT a domain expert must construct the ontology of the domain from scratch.

Typically, the goal in expert systems is to capture an expert's knowledge in computer usable form. In particular procedural knowledge is captured and used for predicting likely responses in particular given situations, such as how to diagnose a disease or how to effect auto repairs. Declarative knowledge is required to create grammars and other spoken dialog components used in spoken language dialog expert systems.

However, in creating spoken language dialog components for such systems, domain models are not explicitly created and, instead, grammars or speech models are induced directly. This direct induction approach requires inputting a corpus of training examples. In grammar development, the input corpus must be annotated for semantics. Such corpora are expensive, difficult to obtain and, their size and quality directly affects the quality of the resulting system, i.e., larger, higher quality and correspondingly more difficult to obtain and so more expensive corpora yield a higher quality spoken language dialog system.

Because of their many advantages, spoken language dialog systems development is an active area of current research and promises many products with a variety of applications. Such products may be used for receiving stock quotes, disseminating weather or yellow pages information, sending and receiving e-mail, as well as using a voice interface to browse the Internet. The main hurdle in getting new products to market is the time and expertise required to create or adapt necessary spoken dialog components, such as grammars, speech recognizers and dialog managers for new domains. Whoever can best streamline the process of porting these components to new domains will have a distinct advantage over others in this competitive field.

Thus, there is a need for an easy way to automatically create declarative domain information in a form that reflects a domain expert's conceptualization of the domain.

BRIEF DESCRIPTION OF THE DRAWINGS

The foregoing and other objects, aspects and advantages will be better understood from the following detailed description of a preferred embodiment of the invention with reference to the drawings in which:

FIG. 3 is pseudocode corresponding to the first step of the preferred embodiment of the present invention in FIGS. 1 and 2.

FIG. 5 is pseudocode corresponding to the second step of the preferred embodiment of the present invention of the flow diagrams of FIGS. 4A–B.

DETAILED DESCRIPTION OF A PREFERRED EMBODIMENT OF THE INVENTION

The present invention is a system, method and program product that allows any person, regardless of their level of domain model creation expertise to create a domain model from a given domain specification. The domain specification may be in the form of a relational database or Application Programming Interface (API). The domain specification contains information available to the preferred embodiment system regarding an application domain but, does not necessarily reflect a human expert's conceptualization of that information. The domain specification may contain functional elements, such as what are referred to as "bridging" tables in a relational database, that have no correlation in the real world but, only exist to facilitate database look-up. Typically, relational databases include only attributes that are string or integer values, each requiring an arbitrary identifier to relate one object to another. Thus, the domain model may include attributes with arbitrary nesting of complex values of objects and each object may have another object as its value.

In particular, the preferred embodiment system is a tool that creates nested structures with optional developer interaction and thus does not require inclusion of artifacts of arbitrary identifiers and bridging tables. Advantageously, the preferred embodiment tool assigns default names drawn from the names of tables and columns in the relational database and, then, allows renaming of objects and attributes from these default names. Thus, a default domain model may be created from a domain specification such as a relational database or API. Then, optionally, a developer with any degree of expertise may interact with the system to further refine and develop the result as desired.

So, first, an intuitive and flexible representation of the domain knowledge is derived from a domain specification. The domain specification includes whatever information is available and, typically, is a relational database or an API. From this domain specification, a default set of objects is extracted, and for each object, a default set of attributes also is extracted. Using, for example, a relational database as an input, each database table is converted into a default domain object with the name of the particular table as the default name of the object. Initially, for each table, each column is a default domain attribute with the name of the column as the default name of the attribute. Correspondingly, for an API input, the default object names are extracted from the names of function arguments and, the names of attributes are extracted from the functions themselves.

Figure 1:
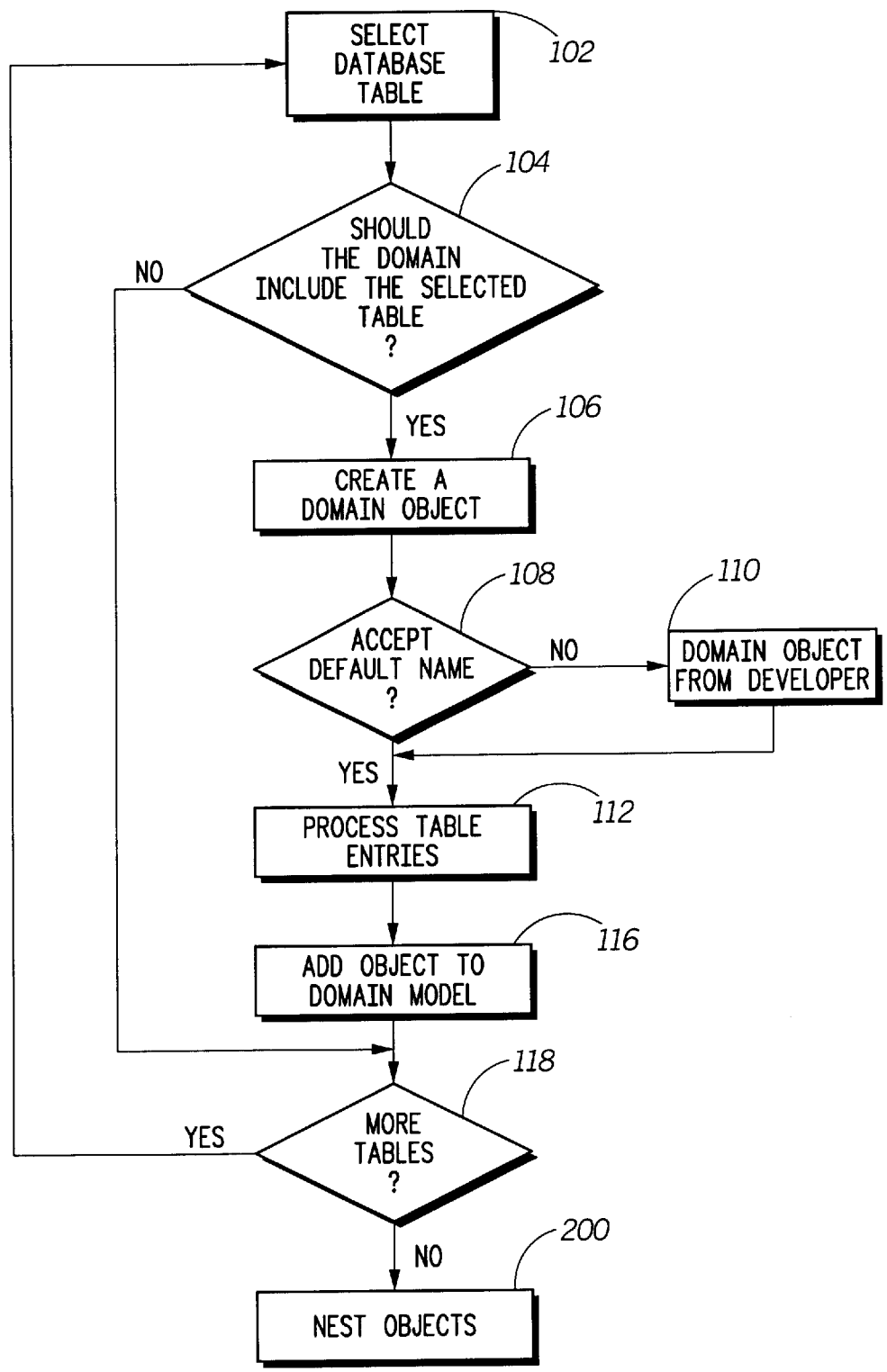
FIG. 1 is a flow diagram of this first step wherein domain objects and attributes are derived from available information.

FIG. 1 is a flow diagram of this first step 100, providing an example wherein domain objects and attributes are derived from available information, i.e., in this example from tables and columns in a database. First, processing the domain specification begins in step 102 as one of the tables is selected from the database, correspondingly, for an API, a function argument would be selected. Then, in step 104 the developer is asked whether the domain model should contain a domain object corresponding to the selected table. If the developer responds yes, then, in step 106 a domain object is created. Object naming begins in step 108 wherein a default name, i.e., the table name or API function name, is presented to the developer and the developer may either accept the default name or provide a name. If the developer decides to provide a name for the object, then, in step 110 the developer's name is attached to the object. Otherwise, the default name is attached to the object.

Next, attributes are identified and named for the domain object beginning in step 112. So, in this example, attributes for the object, the table in this example, are identified by selecting each column and assigning attribute names to selected columns where appropriate. Correspondingly, for an API, function names are extracted and attached as attribute names. In step 114, the object is added to the domain model. In step 116, the database is checked for any remaining unselected potential objects (tables or API functions) and, if any are found, returning to step 102, the next database table or API function is selected and processed. Processing the domain specification continues until all potential objects are either included in or excluded from the domain model. So, when all the tables in the database either have been included as domain objects or rejected and, not included as domain objects, the preferred embodiment tool proceeds to the second step 200, as described herein below, wherein domain object nesting is determined.

An inexperienced developer with no expertise in a particular domain may choose to accept defaults, resulting in creating a default domain model. Although the default domain model is completely functional, it may not be the best conceptualization of the domain knowledge. So, even though the default domain model can be used in the creation of grammars for the given domain, those created grammars may be sub-optimal. By contrast, a more experienced domain developer with a higher level of domain expertise may reject the defaults, selecting other name variations from choices presented by the preferred embodiment system.

Figure 2:
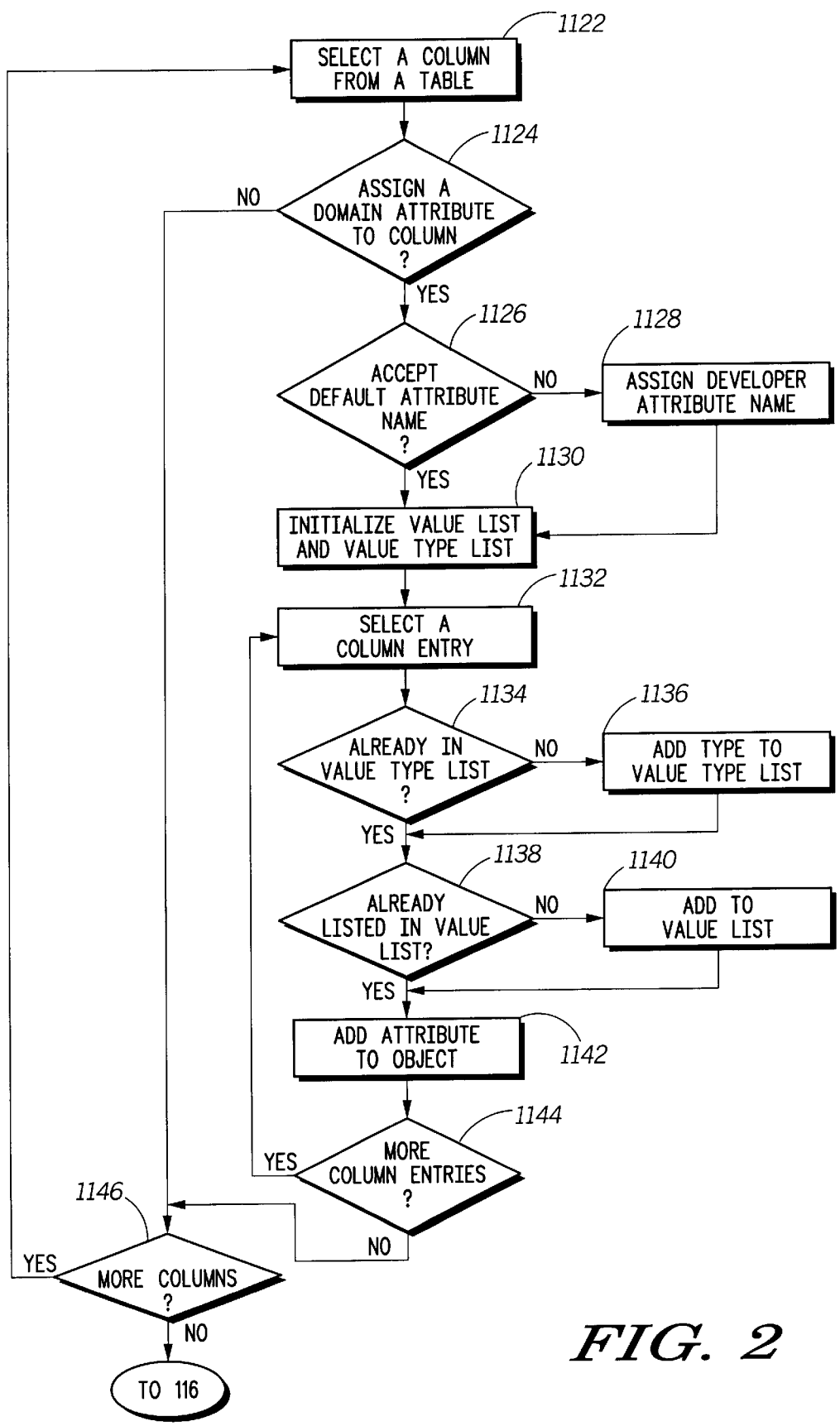
FIG. 2 is a flow diagram showing how table columns are processed.

FIG. 2 is a flow diagram showing how attribute names (for table columns in this example) are processed in step 112. First, in step 1122, columns are selected from the table one at a time. Then, in step 1124, the developer is asked whether to include a domain attribute for the selected column in the domain object. If the developer wishes to include a domain attribute, then in step 1126 the developer is allowed to accept the domain attribute or, in step 1128 the developer may name the domain attribute. In step 1130 two lists, a value list and a value type list, are created and initialized (as empty) for the domain attribute. Then, in step 1132, each entry is selected from the column, one entry at a time. In step 1134, the selected entry is checked to determine if it is contained in the value type list. If it is not found, a value type is added for the selected entry to the value type list in step 1136. Next, in step 1138 the value list is checked to determine whether a value is included for the selected entry. If not, in step 1140, a value is added to the value list. Next, in step 1142 the domain attribute is added to the domain object. In step 1144 the column is checked for any unselected entries and, if unselected entries remain, returning to step 1132, one is selected. However, if all of the column entries have been selected, then, in step 1146 the table is checked to determine if any unselected columns remain and, if so, returning to step 1122, an unselected column is selected. Once all columns have been selected, then, continuing in step 116, the object is added to the domain model.

FIG. 3 is pseudocode of the first step of the preferred embodiment of the present invention corresponding to the flow diagrams of FIG. 1.

Continuing to the second step 200 these named objects and attributes describing the domain are presented to the developer, one object at a time, and within each object, one attribute at a time. If the developer perceives that a given default attribute is an arbitrary identifier of another object, the developer may choose to replace the particular default attribute with an instance of that other object resulting in a nested structure. Similarly, if the developer perceives that a given default object corresponds to a bridging table in a relational database, the developer may use preferred embodiment tool to replace references to that bridging table in each of the referring objects with a direct reference to the bridged to object. At all stages, the developer may reject the default names suggested for objects and attributes by the preferred embodiment tool, selecting instead more intuitive names.

Figure 4A:
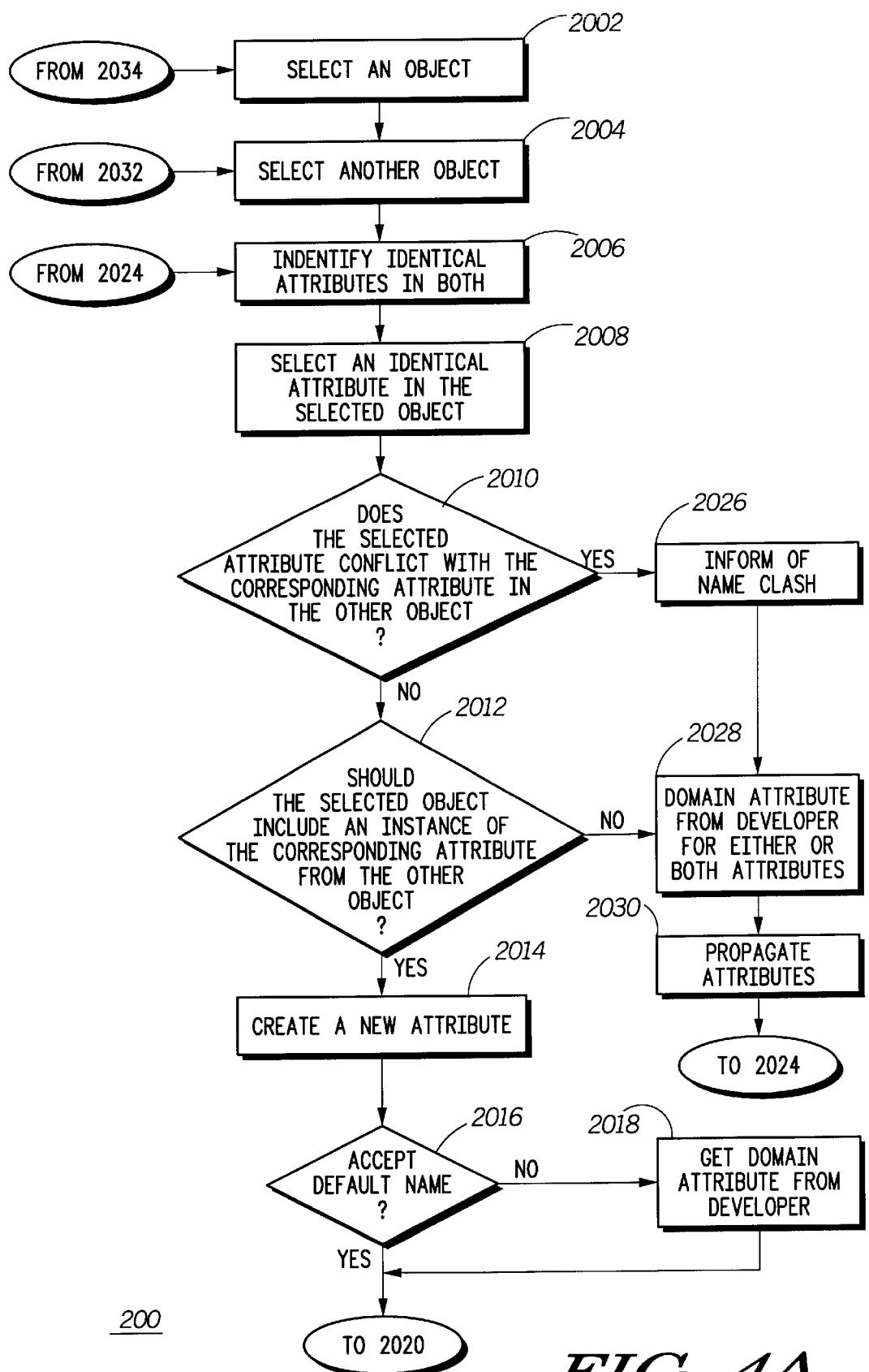
FIGS. 4A and 4B show the second step wherein domain object nesting is determined such that domain objects serve as complex variable values for other domain objects.
Figure 4B:
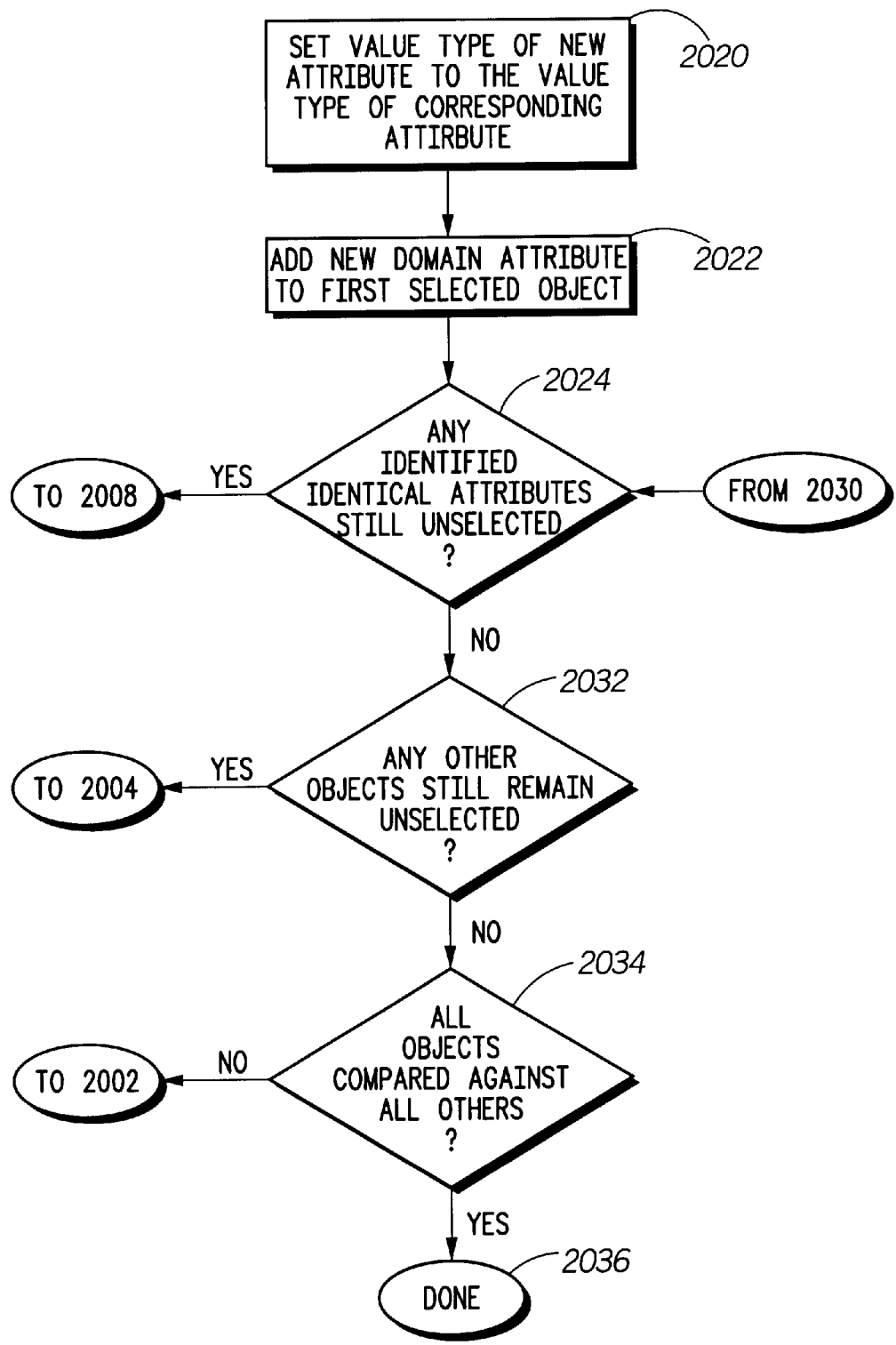

FIGS. 4A–B show the second step 200 wherein domain object nesting is determined such that domain objects serve as complex variable values for other domain objects. FIG. 5 is pseudocode corresponding to the flow chart of the second step 200 of FIGS. 4A–B. First, in step 2002, domain objects are selected one at a time from the domain model. Then, beginning in step 2004, all remaining unselected domain objects are selected, one at a time, checked against the first domain object for attributes with conflicting value types and, names are assigned to non-conflicting attributes. So, in step 2004 a second domain object is selected from the domain model. In step 2006 identically named domain attributes in both the first selected domain object (i.e., selected in step 2002) and the second selected domain object (i.e., selected in step 2004) are identified. In step 2008 each of the identified identically named attributes are selected one at a time. In step 2010, the attribute type for the two identically named attributes are checked to determine whether they conflict. If they are non-conflicting attribute types, then, in step 2012 the developer is asked whether the first object should include a domain attribute with a complex value that is an instance of the second domain object. If the developer responds yes, then, in step 2014 a new domain attribute name is created for the developer which defaults to the attribute name of the second domain object attribute.

Continuing, in step 2016 the developer is asked if the default name is acceptable. If not, then, in step 2018 the developer enters a new domain attribute. Otherwise, the default name is used. Next in step 2020, the value type of the new domain attribute name is set to the value type of the second domain object. In step 2022, the new domain attribute is included in the first domain object. Then, in step 2024, the previously identified identically named attributes are checked to determine whether any identically named attributes still remain unselected. If unselected attributes remain, returning to step 2008 the next name of such identified identically named attribute is selected.

When in step 2010 the type of the attribute selected from the first domain object conflicts with the attribute type of the identically named attribute of the second selected object, then, in step 2026, the developer is informed of a name clash. The developer is then prompted in step 2028 to rename one or both of the domain attributes and, optionally, the developer may be offered default attribute names created using the domain object names as prefixes for the conflicting domain attributes. Once renamed, either using the default names or developer supplied names, continuing to step 2040, the renamed attributes are propagated through the domain model. Again, returning to step 2024, the previously identified identical attributes are checked for any that remain unselected.

If no conflict is found in step 2010, but, in step 2012 the developer decides that the first domain object should not include a domain attribute that is an instance of the second domain object, then in step 2028 the developer is prompted to rename one or both of the attributes. Once, in step 2024, it is determined that all identified identical attributes have been selected, then, in step 2032 a check is made whether other potential objects remain that have not been paired with the first object. If other potential objects remain unpaired, then, returning to step 2004, one of the other remaining objects are selected.

When, in step 2032, all other objects are found to have been paired with the first selected object, then, in step 2034, the objects are checked to see if any have yet been selected for comparison against other objects, i.e., as first objects. If some objects remain, then returning to step 2002, one of the remaining objects are selected. Otherwise, in step 2036, the domain model is complete.

As the domain model develops, it is displayed to the developer in an intuitive format, for example, using a graphical user interface (GUI.) One such intuitive format is an Attribute-Value Matrix (AVM). An AVM is a set of feature-value pairs, where each feature specifies a given slot or location of an object and the corresponding value is a filler for that slot, i.e., information stored at that location. A value in an AVM structure may itself be an AVM structure, thus allowing for any degree of nesting. AVM structures provide a formalized and yet intuitive way to display domain information and are relatively transparent to the developers, regardless of the developer's expertise.

While the invention has been described in terms of preferred embodiments, those skilled in the art will recognize that the invention can be practiced with modification within the spirit and scope of the appended claims.

I claim:

1. A method of creating a domain model, said method being usable by persons inexperienced in creating domain models to create a domain model, said method comprising the steps of:

deriving a representation of domain knowledge from a domain specification, said representation being a plurality of domain objects, each of said domain objects including one or more attributes; and nesting said domain objects, wherein one or more of said domain objects point to one or more other domain objects.

2. A method as in claim 1, wherein the step of deriving the representation of domain knowledge comprises the steps of:
   a) selecting an object from said domain specification;
   b) naming said selected object;
   c) selecting attributes in said selected object; and
   d) assigning names to selected ones of said attributes.

3. A method as in claim 2, wherein the step (a) of selecting the object further comprises:
   i) selecting a candidate object from said domain specification; and
   ii) determining whether to include said selected candidate object in said representation, candidate objects determined to be included in said representation being selected objects.

4. A method as in claim 3, wherein as a name is provided for said selected object in step (b), said provided name is presented to a developer for acceptance, said presented name being a default object name.

5. A method as in claim 4, wherein when said developer rejects said default object name, said developer assigns an object name to said selected object.

6. A method as in claim 5, wherein the step of deriving the representation further comprises the step of:
   e) repeating steps a–d until all candidate objects have been selected in step (a)(i).

7. A method as in claim 6, wherein the step (c) of selecting attributes further comprises:
   i) selecting an attribute candidate for said selected object; and
   ii) determining whether to include said attribute candidate in said representation, attribute candidates determined to be included being selected attributes.

8. A method as in claim 7, wherein the step (d) of selectively naming the attributes comprises presenting a default attribute name to said developer, said developer selectively accepting said attribute name.

9. A method as in claim 8, wherein when said developer rejects said default attribute name, said developer assigns an attribute name.

10. A method as in claim 7, wherein the candidate objects are tables in a relational database, attribute candidates are columns in said tables and step (a)(ii) of determining whether to include a selected table comprises presenting said selected table to said developer, said developer deciding whether said table is included as a domain object; and wherein, the step (c)(ii) of determining whether to include attribute candidates comprises presenting columns from said table to said developer, said developer deciding whether to include said column as an attribute.

11. A method as in claim 1, wherein the step of nesting domain objects comprises the steps of:
   a) pairing domain objects;
   b) identifying attributes having identical names within said paired objects;
   c) identifying conflicting identically named attributes; and
   d) renaming said conflicting attributes.

12. A method as in claim 11, wherein the step (c) of identifying conflicting identically named attributes further comprises:

i) identifying non-conflicting attributes in at least two objects;

ii) including in one or more of the at least two objects an instance of a selected one of the identically named attributes.

13. A method as in claim 12, wherein conflicting attributes have conflicting value types and non-conflicting attributes have non-conflicting value types.

14. A method as in claim 13, wherein the included instance is given a new domain attribute name.

15. A method as in claim 14, wherein the value type of the new domain attribute is set to the value type of the other of said non-conflicting attributes.

16. A system usable by domain developers having any domain development skill level to interactively create domain models, said system comprising:

means for automatically deriving a representation of domain knowledge from a domain specification, said representation being a plurality of domain objects, each of said domain objects including one or more attributes; and means for automatically nesting said domain objects, wherein one or more of said domain objects points to one or more other domain objects.

17. A system as in claim 16, wherein the means for deriving the representation of domain knowledge comprises:

means for selecting an object from said domain specification and presenting said object to a developer;

means for selecting attributes in selected objects and presenting said attributes to said developer; and means for assigning names to selected objects and selected attributes.

18. A system as in claim 17, wherein the means for assigning names comprises:

means for deriving a default name;

means for presenting said default name to said developer; and means for receiving an alternate name from said developer.

19. A system as in claim 18, wherein the developer decides whether to include the presented object in a domain model, included objects being selected objects.

20. A system as in claim 18, wherein the developer decides whether to include the presented attributes in the domain model, included attributes being selected attributes.

21. A system as in claim 16, wherein the domain object nesting means comprises:

means for identifying attributes having identical names within said domain objects;

means for identifying conflicting attributes with identical names; and means for renaming identified conflicting attributes.

22. A system as in claim 21, wherein the domain nesting means further comprises:

means for pairing objects; and means for comparing value types of identically named attributes in paired said objects.

23. A system as in claim 22, further comprising means for assigning a value type to attributes.

24. A computer program product for enabling a domain developer to create domain models, regardless of the domain developer's skill level, said computer program product comprising a computer usable medium having computer readable program code thereon, said computer readable program code comprising:

computer readable program code means for automatically deriving a representation of domain knowledge from a domain specification, said representation being a plurality of domain objects, each of said domain objects including one or more attributes; and computer readable program code means for automatically nesting said domain objects, wherein one or more of said domain objects points to one or more other domain objects.

25. A computer readable program code means for enabling a domain developer to create domain models as in claim 24, wherein the computer readable program code means for deriving the representation of domain knowledge comprises:

computer readable program code means for selecting an object from said domain specification and presenting said object to a developer;

computer readable program code means for selecting attributes in selected objects and presenting said attributes to said developer; and computer readable program code means for assigning names to selected objects and selected attributes.

26. A computer readable program code means for enabling a domain developer to create domain models as in claim 25, wherein the computer readable program code means for assigning names comprises:

computer readable program code means for deriving a default name;

computer readable program code means for presenting said default name to said developer; and computer readable program code means for receiving an alternate name from said developer.

27. A computer readable program code means for enabling a domain developer to create domain models as in claim 26, further comprising:

computer readable program code means for allowing the developer to decide whether to include the presented object in a domain model, included objects being selected objects.

28. A computer readable program code means for enabling a domain developer to create domain models as in claim 27, further comprising:

computer readable program code means for allowing the developer to decide whether to include the presented attributes in the domain model, included attributes being selected attributes.

29. A computer readable program code means for enabling a domain developer to create domain models as in claim 28, wherein computer readable program code means for domain object nesting comprises:

computer readable program code means for identifying attributes having identical names within different said domain objects;

computer readable program code means for identifying conflicting attributes with identical names; and computer readable program code means for renaming identified conflicting attributes.

30. A computer readable program code means for enabling a domain developer to create domain models as in claim 29, wherein the computer readable program code means for domain nesting further comprises:

computer readable program code means for pairing domain objects; and computer readable program code means for comparing value types of identically named attributes in paired said domain objects.

31. A computer readable program code means for enabling a domain developer to create domain models as in claim 30, further comprising computer readable program code means for selectively assigning value types to attributes.

\* \* \* \* \*